(12) United States Patent
Harris et al.

(10) Patent No.: US 7,010,978 B1
(45) Date of Patent: Mar. 14, 2006

(54) ELECTRICALLY OPERATED TUNING FORK

(75) Inventors: Martin Russell Harris, Windsor (AU); Gavan Edmund Rosman, Camberwell (AU); James Rudge, Donvale (AU)

(73) Assignee: Optiscan PTY Ltd., Nottingham Hill (AU)

( * ) Notice: Subject to any disclaimer, the term of this patent is extended or adjusted under 35 U.S.C. 154(b) by 0 days.

(21) Appl. No.: 09/980,825

(22) PCT Filed: Jun. 8, 2000

(86) PCT No.: PCT/AU00/00647

§ 371 (c)(1),
(2), (4) Date: Apr. 1, 2002

(87) PCT Pub. No.: WO00/75712

PCT Pub. Date: Dec. 14, 2000

(30) Foreign Application Priority Data

Jun. 8, 1999 (AU) ..................... PQ0815

(51) Int. Cl.
*G01P 9/04* (2006.01)
*G01J 1/42* (2006.01)

(52) U.S. Cl. ................ 73/504.16; 73/514.31; 250/227.11

(58) Field of Classification Search ........... 73/504.16, 73/514.31; 385/12; 250/227.11; 310/370
See application file for complete search history.

(56) References Cited

U.S. PATENT DOCUMENTS

| | | | | |
|---|---|---|---|---|
| 3,622,819 A | * | 11/1971 | Koehler | 310/25 |
| 3,753,058 A | * | 8/1973 | Edson | 318/118 |
| 3,803,521 A | * | 4/1974 | Hetzel | 333/71 |
| 5,067,344 A | * | 11/1991 | Fitzgerald et al. | 73/54.24 |
| 5,148,733 A | * | 9/1992 | Beller | 84/726 |
| 5,193,391 A | * | 3/1993 | Cage | 73/505 |
| 5,214,279 A | * | 5/1993 | Hakamata | 250/234 |
| 6,474,162 B1 | * | 11/2002 | Voss et al. | 73/504.16 |

FOREIGN PATENT DOCUMENTS

| | | |
|---|---|---|
| GB | 2114745 | 8/1983 |
| JP | 61-102512 | 5/1986 |
| WO | WO 99/04301 | 1/1999 |

* cited by examiner

*Primary Examiner*—Helen Kwok
(74) *Attorney, Agent, or Firm*—Greenblum & Bernstein, P.L.C.

(57) ABSTRACT

An electrically operated tuning fork apparatus includes a tuning fork having a base and a pair of tines. The tines have tips remote from the base, and are formed of or include material in which a magnetic field can be induced. The tuning fork apparatus also includes an electrical coil configured to receive at least a portion of both tines of the tuning fork. At least one of the tines can be vibrated relative to the other of the tines by passing a varying current through the coil to induce mutually repulsive magnetic fields in the tines.

39 Claims, 3 Drawing Sheets

ELECTRICALLY OPERATED TUNING FORK

FIELD OF THE INVENTION

The present invention relates to electrically operated tuning forks, of particular but by no means exclusive application in oscillating tuning forks for optical fibre scanning in, for example, endoscopes and microscopes.

BACKGROUND OF THE INVENTION

Electromagnets have been used to oscillate tuning forks to form oscillators and compact narrow bank audio filters. More recently these oscillators have been used in optical applications, such as with laser beam choppers and optical fibre scanning.

Existing systems, however, have a number of drawbacks. For example, one optical oscillator includes an optical fibre attached to the tuning fork, to provide a simple and efficient integrated optical scanner. In these existing systems, a pair of electromagnets is used to vibrate the tines of the tuning fork, with the optical fibre attached to one of the tines. Typically the electromagnets are located either between the tines or disposed on opposite sides of the fork. However, owing to the size of the electromagnets, a lower limit is imposed on the overall size of the scanner (i.e. fork and electromagnets) and if, for example, an outside diameter of less than about 7 mm is required, such as in endoscope applications, very little space is left for deflection of the attached fibre.

SUMMARY OF THE INVENTION

It is an object of the present invention to provide an electrically operated tuning fork by enclosing the fork either partially or wholly within a electromagnet.

The present invention provides, therefore, an electrically operated tuning fork apparatus, comprising:
  a tuning fork having a base and a pair of tines, said tines and having tips remote from said base and formed of or including material in which a magnetic field can be induced;
  a electrical coil for receiving at least a portion of both tines of said tuning fork;
  whereby at least one of said tines can be vibrated relative to the other of said tines by passing a varying, substantially unidirectional current through said coil and thereby inducing mutually repulsive magnetic fields in said tines.

Preferably said varying current has a substantially square wave form, and more preferably of substantially 50% duty cycle. Preferably said material is magnetically permeable, and more preferably said material is ferromagnetic.

Thus, this method of vibrating the tine or tines may be less efficient than the existing arrangements (in which the magnetic fields produced by current in the electromagnets are longitudinal); here they are essentially transverse, resulting in mutual repulsion between the tines even in the absence of any other magnetically active material. Preferably the tines are vibrated at the resonant frequency of the tuning fork. With this configuration, both winding strength and packing density of the coil can be maximized by eliminating the need for windings between the tines. The winding is external to the fork and preferably extends over nearly the entire length of the fork, contributing to driving force through induced magnetism even in the base region where the tines are joined. This arrangement therefore allows the largest winding volume, though the winding strength is reduced owing to the larger diameter of the turns compared with the localised windings of the existing designs. However this is compensated by the large cross section available for the winding. At any point along the entire length of the fork the (typically coaxial) winding of the coil contributes to the driving force, even the region beyond the base of the tuning fork.

Preferably said tips of the tines protrude from the coil so that said at least one of said tips can vibrate by a greater amplitude than can be accommodated by said coil.

Clearly the greater the proportion of the tines within the coil, the greater the efficiency of the apparatus (in terms of tine deflection for a particular coil current), but it may be desirable to sacrifice some of the efficiency by allowing the tips of the tines (including a portion of the tines adjacent thereto) to project from the coil so that they can vibrate with an amplitude greater than the inside dimension of the coil.

The coil may be coaxial with said fork, but need not be strictly so. Indeed, the coil need not be cylindrical. It could, for example, be elliptical, with a major axis of the ellipse oriented in the plane of vibration of the tines, so that a reduction in the total size of the apparatus can be achieved.

Preferably said apparatus includes additional magnetically permeable material located outside said coil for providing a return path for the magnetic field produced by said coil, and attracting said tines towards said additional material to augment the repulsion of said tines.

Preferably one of said tines is more massive than the other of said tines, so that said less massive of said tines is deflected while said more massive of said tines is substantially undeflected.

Preferably said more massive of said tines is tapered to accommodate deflection of said less massive of said tines. Preferably said apparatus includes a biasing permanent magnet adjacent said base of said tuning fork or located around at least a portion of said tuning fork.

Preferably said apparatus includes an optical fibre located on said at least one of said tines.

Preferably said coil is a former-less coil.

Preferably said apparatus includes a sensor to provide a signal indicative of the position of said at least one tine so that the tuning fork can be maintained at resonance.

Preferably said sensor is a piezoelectric sensor, a fibre sensor system, a hall effect sensor or a series capacitive sensor.

The present invention also includes an endoscope, microscope or endomicroscope including an apparatus as described above.

The present invention also includes a scanning head for an endoscope, microscope or endomicroscope including an apparatus as described above.

The present invention still further a method for electrically vibrating a tuning fork having a base and a pair of tines, said tines and having tips remote from said base and formed of or including material in which a magnetic field can be induced, said method comprising:

locating at least a portion of said tines within a electrical coil; and passing a varying, substantially uni-directional current through said coil to induce mutually repulsive magnetic fields in said tines and thereby inducing at least one of said tines to vibrated relative to the other of said tines.

Preferably said varying current has a substantially square wave form, and more preferably of substantially 50% duty cycle. Preferably said material is magnetically permeable, and more preferably said material is ferromagnetic.

Preferably said method includes arranging said tips to protrude from said coil so that said at least one of said tips can vibrate by a greater amplitude than can be accommodated by said coil.

Preferably said coil is elliptical, with a major axis oriented in the plane of vibration of said at least one tine.

Preferably said method includes locating additional magnetically permeable material located outside said coil to provide a return path for the magnetic field produced by said coil, and thereby attracting said tines towards said additional material to augment the repulsion of said tines.

Preferably one of said tines is more massive than the other of said tines, so that said less massive of said tines is deflected while said more massive of said tines is substantially undeflected.

Preferably said more massive of said tines is tapered to accommodate deflection of said less massive of said tines.

Preferably the method includes varying said current so as to vibrate said tuning fork at the resonant frequency of said tuning fork.

Preferably said method includes magnetically biasing said tuning fork by locating a permanent magnet adjacent said base of said tuning fork or located around at least a portion of said tuning fork.

The present invention also includes a method of vibrating an optic fibre in an endoscope, a microscope or an endomicroscope by means of the method described above.

BRIEF DESCRIPTION OF THE DRAWINGS

In order that the present invention may be more clearly ascertained, preferred embodiments will now be described, by way of example, with reference to the accompanying drawings, in which.

DETAILED DESCRIPTION OF THE INVENTION

Figure 1:
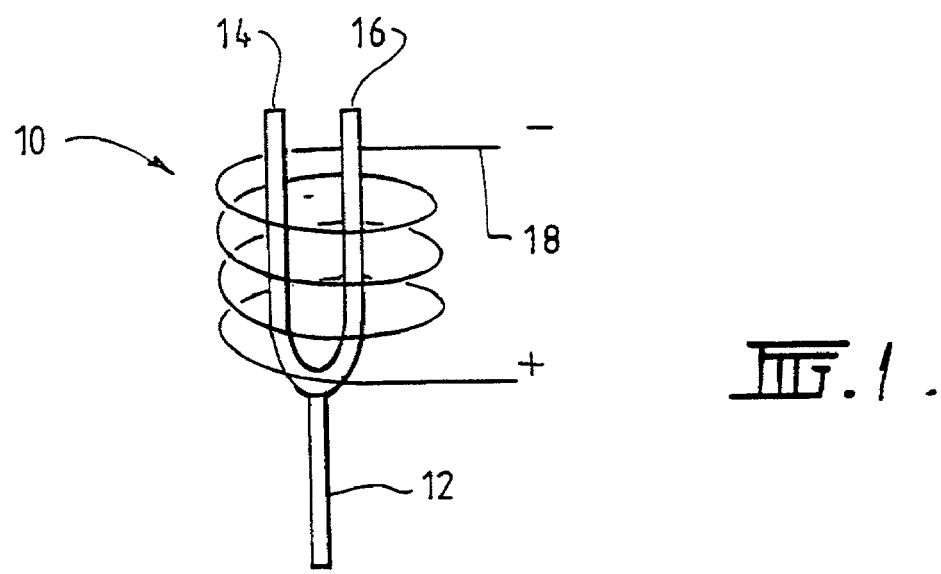
FIG. 1 is a schematic view of an electrically operated tuning fork in accordance with a preferred embodiment of the present invention.

An electrically operated tuning fork according to a preferred embodiment of the present invention is shown schematically at 10 in FIG. 1. The electrically operated tuning fork 10 includes a tuning fork 12 with tines 14 and 16, and an electrical coil 18 disposed coaxially about tuning fork 12. The tines 14 and 16 project from coil 18 by approximately 15% of their length. Thus, when an electrical current is applied to coil 18, the magnetic field produced by current in the coil is longitudinal and induces magnetic fields in and about tines 14 and 16 that are mutually repulsive, even in the absence of any other magnetically active material. The winding of the coil 18 along almost the full length of the tines 14 and 16 means that the electrically operated tuning fork 10, although of low efficiency, can nevertheless be used to produce sufficiently large magnetic fields to provide the deflection necessary for use in optic fibre scanners, such as optical fibre confocal microscopes.

Figure 2:
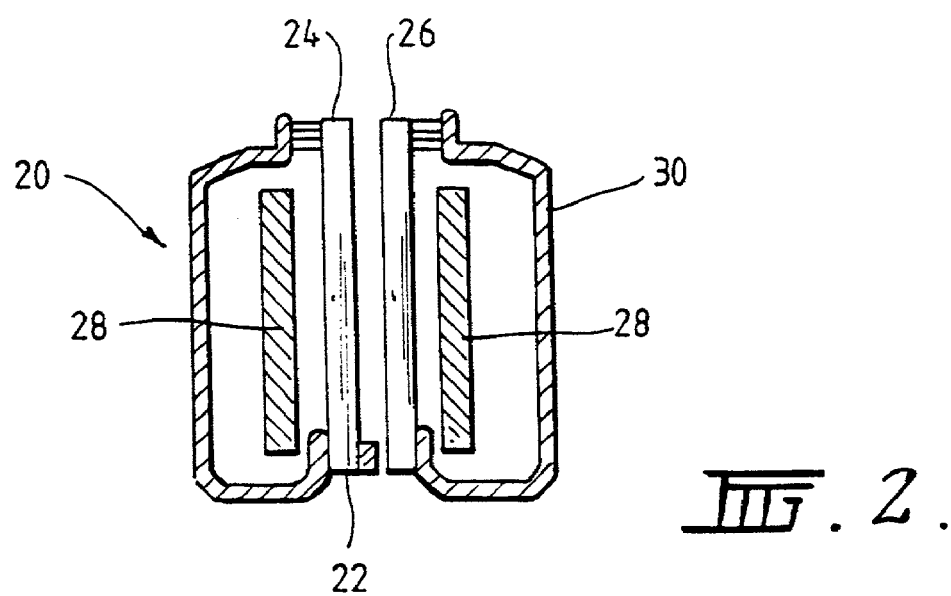
FIG. 2 is schematic cross-sectional view of an electrically operated tuning fork in accordance with a second preferred embodiment of the present invention.

An electrically operated tuning fork according to a further preferred embodiment of the present invention is shown generally at 20 in FIG. 2. This electrically operated tuning fork 20 is generally similar to that of FIG. 1, and includes tuning fork 22 with tines 24 and 26, and coil (shown in cross section) 28. However, this embodiment additionally includes a housing 30 of iron or other ferromagnetic material, to provide a return path for the magnet field generated by coil 28. Housing 30 allows two complete magnetic circuits to be formed containing essentially the full length of each tine 24 and 26 in series with the external magnet material of housing 30 and the air gap around the tips of tines 24 and 26. Current through the coil 28 causes an attractive force across the air gap between the respective tines 24 and 26 and the housing 30, as well as the mutual repulsion between the tines 24 and 26 discussed above.

Figure 3:
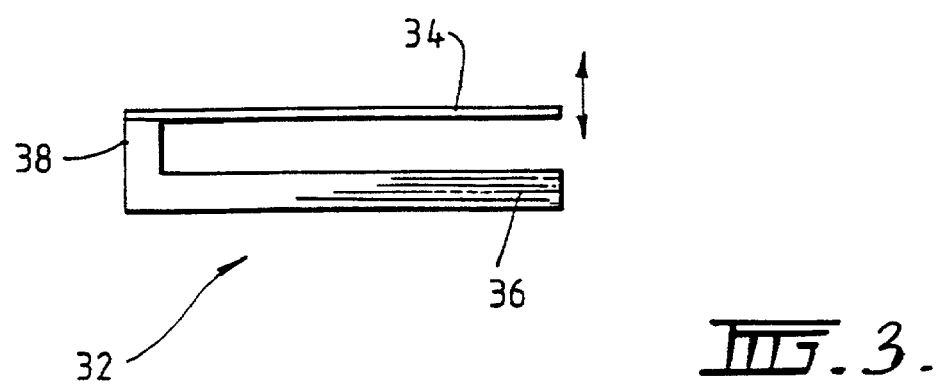
FIG. 3 is a view of an asymmetric tuning fork of an electrically operated tuning fork according to a third preferred embodiment of the present invention.
Figure 4:
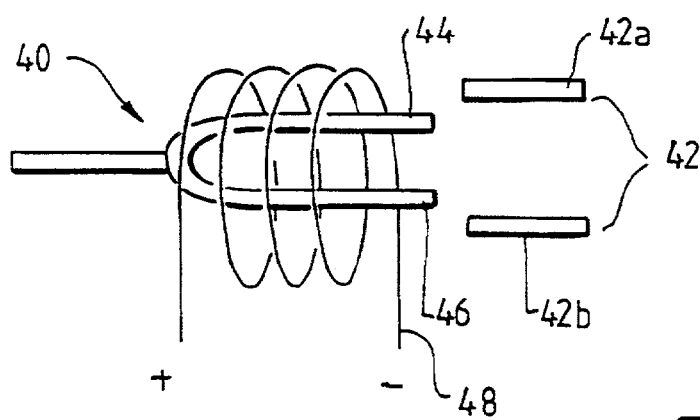
FIG. 4 is a view of an electrically operated tuning fork according to a fourth preferred embodiment of the present invention.

The tuning fork of a still further preferred embodiment of the present invention is shown generally at 32 in FIG. 3. The tuning fork 32 of this embodiment has asymmetric tines 34 and 36, so that almost all the vibrational energy, corresponding to tine deflection, of the tuning fork 32 is taken up by a single tine, that is less massive tine 34. By providing a suitable mounting at the base 38 of tuning fork 32, it is possible to avoid the need to match the individual resident frequencies of the respective tines 34 and 36. If the stiffness of the more massive tine 36 is increased in proportion to its mass, however, balance can still be achieved. Further, piezoelectric feedback from the base 38 and laser pulse ablation can be used to automate the balancing process.

A further advantage of the asymmetrical configuration is that tine deflection can be markedly increased to the extent that with relatively small overhang, the tip of a fibre (not shown) mounted on less massive tine 34 can be scanned over the full available inside diameter of the coil (not shown).

In a still further embodiment 40 of an electrically operated tuning fork according to the present invention, additional driving force can be obtained by including high permeability material 42 beyond the tips of tines 44 and 46. High permeability material 42 comprises two strips 42a and 42b to which the tips of tines 44 and 46 are attracted when the coil 48 is activated, owing to the induction of magnetism in the strips 42a and 42b by the fringe field of the coil 48 together with the magnetism of the tines 44 and 46. This configuration is of use if there is insufficient space, owing to restrictions in the external diameter of coil 48, for a return magnetic circuit such as that provided in the embodiment of FIG. 2. Tests using external pole pieces indicate that deflection increases as magnetic material outside the coil is brought near a vibrating tine. However the increase in deflection is only around 20 to 30% compared to a tine-only design, and the return magnetic path occupies valuable space.

In use of any of the above embodiments, to achieve efficient operation care must be taken to provide an appropriate draft current. In the absence of any residual or steady magnetic field, the force on the tine is in only one rejection as the force in coil, regardless of direction, produces mutual repulsion of the tines (or, in the case of the complete magnetic circuit, an additional force involving a traction across the air gap to the external magnetic material). Under the circumstances a sinusoidal current is not preferred, especially if magnetic saturation is approached. With a sinusoidal current, the driving force peaks twice per electrical cycle and returns to zero for only a very short proportion of the cycle time, resulting in very poor efficiency. Instead, a square wave pulse of 50% duty cycle is used to produce an optimum drive force, even under conditions of magnetic saturation. This has the added advantage that the electrical frequency is equal to the mechanical vibration frequency. The preferred frequency of vibration of the tuning fork for most applications will be its resonant fork.

Slight improvement might be expected if a small reverse current were applied during the off period so as to cancel any remnant flux, but since the force is proportional to $B^2$ the benefit may not be worth the added complexity, particularly as coil heating was not found to be a problem in laboratory prototypes.

Figure 5:
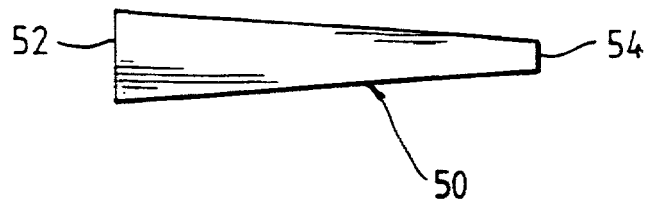
FIG. 5 is a view of a tapered tine preferably employed in any of the preferred embodiments of the present invention.

Further, in any of the above embodiments, when maximum frequency of operation is required for a given length of tine, its is advantageous to taper the width of the tine towards its tip. Although a factor of four increase is possible in the maximum frequency of operation of a tine that sharply decreases in width at its halfway point, a uniform or linear taper is more practical and has a more useful deflection curve as a function of position from the base or built-in end of the tine. The upgrade in frequency can be almost doubled by this procedure. This is depicted schematically in FIG. 5 in which tine 50 (shown in profile) includes broad, stationary built-in end 52 tapering steadily towards tip 54.

Figure 6:
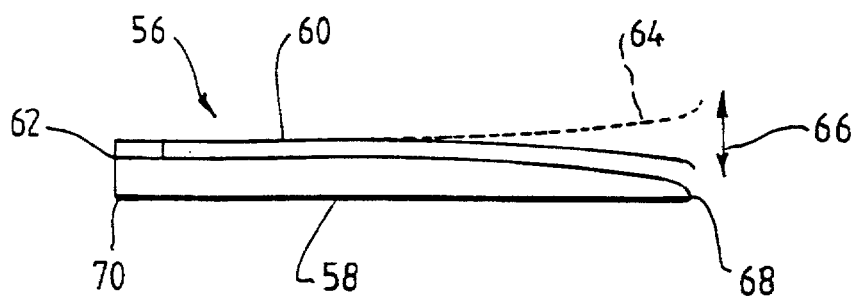
FIG. 6 is a view of asymmetric tines in a preferred form for use with the embodiment of FIG. 3.

To obtain maximum driving force, and also to increase the mass of the fixed tine in those embodiments with asymmetric tines, the thickness of the fixed tine can be made to conform to the deflection of the vibrating, less massive tine at maximum deflection. Such a configuration is shown in FIG. 6, in which tuning fork 56 includes a more massive tine 58 and a less massive tine 60 joined at based 62. Less massive tine 60 is shown in this figure at its point of maximum downwards deflection, with its point of maximum upwards deflection shown by means of a dashed line 64. In use, tine 60 vibrates between these extremes as indicated by arrow 66. More massive tine 58 is tapered towards its tip 68 to accommodate the downwards deflection of less massive tine 60, thereby enabling massive tine 60 to vibrate through a greater amplitude without increasing the overall diameter of the tuning fork. That the maximum thickness of the more massive tine 58 is at built-in end 70 is also convenient for providing secure attachment of the vibrating, less massive tine 60.

Figure 7:
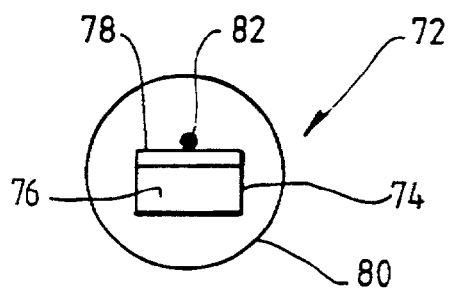
FIG. 7 is an end view of the electrically operated tuning fork of FIG. 3, with an attached optical fibre.

The use of a single tine for predominant deflection results in a straight-through geometry well adapted to the attachment of an optical fibre. FIG. 7 is an end view of such an arranged in which electrically operated tuning fork 72 includes tuning fork 74 with more massive tine 76 and less massive tine 78, surrounded by coil 80. An optical fibre 82 (shown end on) is attached to the outside of less massive tine 78. In the rest position shown, the fibre 82 is essentially straight, with easy access at the built-end (not shown) of the tuning fork 74 and line of sight through the interior of coil 80. Further, problems with additional fibre bend loss due to high fibre curvature (which can occur at the base of a normal tuning fork when a fibre is threaded around onto the inside surface of a tine) is reduced or avoided.

Figure 8:
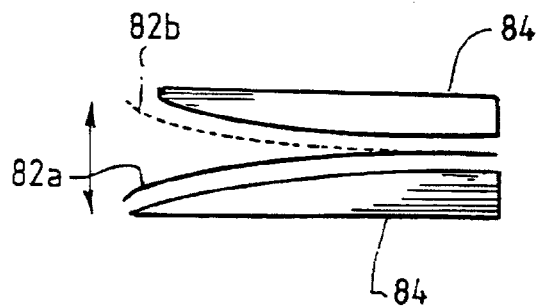
FIG. 8 is a schematic view of an electrically operated tuning fork according to a still further embodiment of the present invention, with progressively reduced number of windings in the coil.

Although a coil winding of a few layers is sufficient to provide adequate driving force in most cases, it is possible to take advantage of the small deflection of the tines at the built-end or base of the tuning fork and provide more layers of winding in that region. This is depicted schematically in FIG. 8 in which the maximum deflection of the tuning fork tines is represented by solid line 82a and the dashed line 82b, and the windings of the coil are shown in cross section at 84. The windings 84, thus, conform to the vibration curve of the tuning fork. Depending of tine width and the maximum deflections needed, the number of layers is progressively reduced towards the tips of the tines. In the same way, it is possible to employ non-circular windings to accommodate tine deflection. The coil, in that embodiment, has a major axis in the plane of vibration to the tine or tines, but a minor axis of smaller length as it is not required to accommodate any vibration. Thus, a reduction in the overall apparatus is achieved, which may be of advantage when used in a scanning endoscope, in which scanning in a direction orthogonal to that provided by the tuning fork is achieved by moving the tuning fork apparatus within a larger housing.

Figure 9:
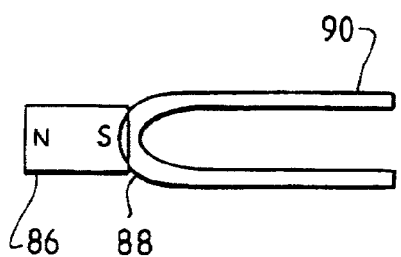
FIG. 9 is a schematic view of the tuning fork of an electrically operated tuning fork according to a still further preferred embodiment of the present invention, incorporating a permanent magnet.
Figure 10:
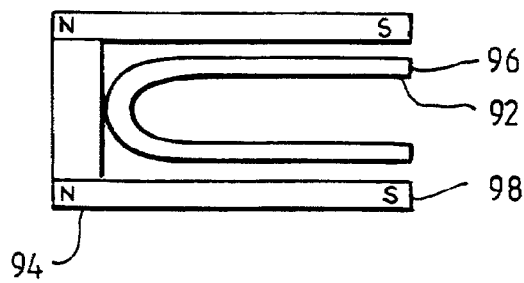
FIG. 10 is a schematic view of the tuning fork of an electrically operated tuning fork according to a still further preferred embodiment of the present invention, incorporating a cylindrical permanent magnet.

In some embodiments, permanent magnets may be incorporated in a variety of ways to improve efficiency, especially if maximum miniaturisation is not required. Referring to FIG. 9, this could be achieved by locating a permanent magnet 86 and the base 88 of the tuning fork 90, with magnetic 86 axially magnetised and installed at the base 88 with the return magnetic path outside the coil (not shown). Referring to FIG. 10, enclosing the tuning fork 92 in a cylindrical permanent magnet 94, cut longitudinally if necessary to avoid any current losses, at polarised in the axial direction. The tines 96, 98 or tuning fork 92 are then pulled apart slightly in the static or equilibrium position, and this force is modulated by the current in the coil (not shown). In this case, sinusoidal current can be used without any frequency-doubling effect.

Figure 11A:
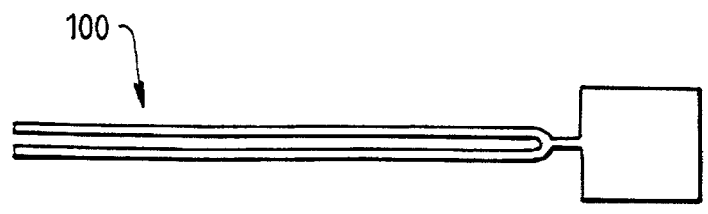
FIG. 11A is a view of a tuning fork according to a preferred embodiment of the present invention.
Figure 11B:
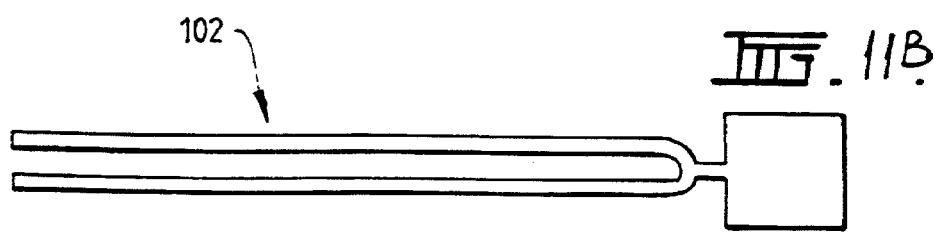
FIG. 11B is a view of a tuning fork according to a preferred embodiment of the present invention, similar to but larger than that of FIG. 11A.

In experiments with electrically driven tuning forks of the type described above, it was found that a limiting factor was the solder joint at the base of the tines and the tine balance. Consequently, two very small tuning forks were wire cut, the with an overall size limit of 3 mm including the coil, the second somewhat larger with an overall size limit of 4 mm. These tuning forks 100 and 102 respectively are shown in FIGS. 11A and 11B.

Tuning fork 100 was made with some difficulty from transformer laminations, as the force of the wire on the tines was causing it to deflect when it was cutting; the solution was to cut two forks stacked together. The larger tuning fork 102 was cut out of 1 mm thick mild steel; no comparable problems were encountered.

The performance of the forks 100 and 102 was tested; both resonated around 680 Hz. The 3 mm fork 100 was extremely small and great care had to be taken to ensure that it was not damaged owing to the tine size of 0.3 mm×0.5 mm. Tine deflection was estimated to be around the 250 $\mu$m.

The 4 mm tuning fork 102 was easier to handle owing to its larger dimensions; the tine size was 1 mm×0.5 mm. It had a much larger deflection (estimated to be 0.5 mm), and had a much more positive ring to it.

Former-less miniature coils were constructed to minimise the amount of space taken up by the coil. The method that is described below was developed over many prototypes and this method proved to produce the most consistent and reproducible results.

Initially two steel or brass strips of 1 mm×0.5 mm×35 mm long were inserted into a heat shrink (preferably of the correct size so that it does not have to be pre-shrunk, as this makes it easier to remove at the end), to act as a former during the manufacture of the coil. If the heat shrink is a little loose, it should be gently heated until the heat shrink is firm.

Two strips of PVC electrical tape approximately 7 mm wide×100 mm long were cut. The first piece of tape was wound on at one end of the heat shrink to form a stop so that, when the coil is wound, it has square ends. The second piece of tape is wound at the other end, the distance between the two pieces of tape defining the length of the coil. Care should be taken to ensure that the tape is square.

The wire that was used for winding the coil was 0.15 mm enamelled copper wire. The winding of the coil was commenced by secure the wire at one end with a small price of adhesive tape.

The best of the coils were hand wound although this takes a little longer it ensures that the wire is very tightly packed together. The hand winding was done by turning the former with the thumb and the index finger. When winding the coil tension was kept on the wire until the coil was complete.

Coils were wound with three layers of wire, which seemed to give enough turns to drive the tuning forks at resonance without overheating.

Once the three layers of windings are complete, the loose end of the wire should be taped to the other end of the former. A small amount of 5 minute epoxy was used to glue the coil area and ensure that all parts are covered. Once the epoxy has reached the tacky stage, the tape holding the ends of the copper wire were removed, and the epoxy allowed to harden.

Next, the two strips of metal in the middle of the coil were removed by using two pairs of pliers and gently bending over one side of the strip with the pliers. One pair of pliers was placed on the top strip and one pair on the pair on the bent strip, and the two strips slid against one another.

A heat gun was applied to the heat shrink; it was then allowed to cool, and then the heat shrink was removed.

If an electrically operated the tuning fork according to the present invention is integrated into an endomicroscope, a system may be required to maintain the fork at resonance and it may also be beneficial to know the position of the vibrating tine with the optical fibre to co-ordinate this with the slow scan in the other plane (i.e. orthogonal to that vibration of the tine(s)).

A piezoelectric film sensor could be employed, as it has a thickness of only about 0.2 mm, which could be incorporated onto the bottom of the tuning fork. The addition of the film could detune the tine that the film is attached to. Alternatively, a fibre sensor system could be used, comprising two optical fibres, one carrying the laser light and the other returning the signal. The light from the laser is beamed onto one of the tines (preferably polished to increase the light reflected); the amount of light returned via the second fibre varies according to the angle of the tine. The feedback fibre would be directed at a photodiode which converts the light intensity to an analogue signal.

A hall effect sensor detects changes in magnetic flux density, so such a sensor could be placed at the end of one of the tines to detect its movement, though possible interference due to the coil could make the signal very noisy and the component size is quite large. This system has several advantages: it is totally non-contact and the sensors are relatively inexpensive.

A series capacitive sensor may be most practical method of both sensing the tine position, and obtaining a feedback signal for the drive circuit. A high frequency signal is applied to the tuning fork assembly which is insulated from all other parts. As the tine moves the pick-up signal is amplitude modulated, and the detected signal amplified to provide the drive current to the coil. With the correct phase shift and sufficient gain resonant oscillation is obtained.

Integrated circuits designed for LUDT (Linear Variable Differential Transformers) can be used in this application.

Further modifications within the spirit and scope of the invention may readily be effected by person skilled in the art. It is to be understood, therefore, that this invention is not limited to the particular embodiments described by way of example hereinabove.

What is claimed is:

1. An electrically operated tuning fork apparatus, comprising:
    a tuning fork having a base and a pair of tines, said tines having tips remote from said base and formed of or including material in which a magnetic field can be induced;
    an electrical coil having a substantially linear longitudinal axis within said coil, at least a portion of both tines of said tuning fork being located within said coil and parallel to said axis, with no portion of said coil being located between the tines of said tuning fork; and
    a position sensor to provide a signal indicative of the position of said at least one tine so that the tuning fork can be maintained at resonance;
    whereby at least one of said tines can be vibrated relative to the other of said tines by passing a varying current through said coil to thereby induce mutually repulsive magnetic fields in said tines essentially transverse to said tines.

2. An apparatus as claimed in claim 1, wherein said varying current has a substantially square wave form.

3. An apparatus as claimed in claim 1, wherein said varying current has a substantially square wave form and a substantially 50% duty cycle.

4. An apparatus as claimed in claim 1, wherein said tips of the tines protrude from the coil so that at least one of said tips can vibrate by a greater amplitude than can be accommodated by said coil.

5. An apparatus as claimed in claim 1, wherein said coil is elliptical, with a major axis oriented in the plane of vibration of the tines, so that a reduction in the total size of the apparatus can be achieved.

6. An apparatus as claimed in claim 1, wherein said apparatus includes additional magnetically permeable material located outside said coil for providing a return path for the magnetic field produced by said coil, and to attract said tines towards said additional material to augment the repulsive magnetic fields in said tines.

7. An apparatus as claimed in claim 1, wherein one of said tines is more massive than the other of said tines, so that the other of said tines is deflected while said more massive of said tines is substantially undeflected.

8. An apparatus as claimed in claim 7, wherein said more massive of said tines is tapered to accommodate deflection of the other of said tines.

9. An apparatus as claimed in claim 1, including a biasing permanent magnet adjacent said base of said tuning fork or located around at least a portion of said tuning fork.

10. An apparatus as claimed in claim 1, including an optical fibre located on said at least one of said tines.

11. An apparatus as claimed in claim 1, wherein said coil is tapered according to the deflection curve of said tines.

12. An apparatus as claimed in claim 1, wherein said coil does not include a former.

13. An apparatus as claimed in claim 1, wherein said position sensor is a piezoelectric sensor, a fiber sensor system, a hall effect sensor or a series capacitive sensor.

14. An endoscope, microscope or endomicroscope including an apparatus as claimed in claim 1.

15. A scanning head for an endoscope, microscope or endomicroscope including an apparatus as claimed in claim 1.

16. A method for electrically vibrating a tuning fork having a base and a pair of tines, said tines having tips remote from said base and formed of or including material in which a magnetic field can be induced, said method comprising:
    locating at least a portion of said tines within an electrical coil parallel to a substantially linear longitudinal axis of said coil, with no portion of said coil being located between the tines of said tuning fork, said longitudinal axis of said coil being within said coil;
    providing a signal indicative of the position of said at least one tine so that the tuning fork can be maintained at resonance; and
    passing a varying current through said coil to induce mutually repulsive magnetic fields in and essentially transverse to said tines to thereby induce at least one of said tines to vibrate relative to the other of said tines.

17. A method as claimed in claim 16, wherein said varying current has a substantially square wave form.

18. A method as claimed in claim 16, wherein said varying current has a substantially square wave form and a substantially 50% duty cycle.

19. A method as claimed in claim 16, including arranging said tips to protrude from said coil so that at least one of said tips can vibrate by a greater amplitude than can be accommodated by said coil.

20. A method as claimed in claim 16, wherein said coil is elliptical, with a major axis oriented in the plane of vibration of said at least one tine.

21. A method as claimed in claim 16, including providing additional magnetically permeable material located outside said coil to provide a return path for the magnetic field produced by said coil, and thereby attracting said tines towards said additional material to augment the repulsive magnetic fields in said tines.

22. A method as claimed in claim 16, wherein one of said tines is more massive than the other of said tines, so that the other of said tines is deflected while said more massive of said tines is substantially undeflected.

23. A method as claimed in claim 22, wherein said more massive of said tines is tapered to accommodate deflection of the other of said tines.

24. A method as claimed in claim 16, including varying said current so as to vibrate said tuning fork at the resonant frequency of said tuning fork.

25. A method as claimed in claim 16, including magnetically biasing said tuning fork by locating a permanent magnet adjacent said base of said tuning fork or located around at least a portion of said tuning fork.

26. A method as claimed in claim 16, wherein said signal is provided by a position sensor and wherein said position sensor is a piezoelectric sensor, a fiber sensor system, a hall effect sensor or a series capacitive sensor.

27. A method of vibrating an optic fiber in an endoscope, a microscope or an endomicroscope including the method as claimed in claim 16.

28. An apparatus as claimed in claim 1, wherein said varying current is substantially uni-directional.

29. An apparatus as claimed in claim 1, wherein said coil is substantially cylindrical.

30. An apparatus as claimed in claim 1, wherein said apparatus includes a piezoelectric sensor mechanically coupled to said tuning fork to provide a signal indicative of deflection angle of one of said tines.

31. An apparatus as claimed in claim 1, wherein said apparatus includes a fiber sensor system comprising a first optical fiber for directing laser light onto a portion of one of the tines, a second optical fiber for collecting the laser light reflected from said portion of said one of the tines, and a photodetector for detecting laser light collected by said second optical fiber and outputting an output signal, wherein said output signal is indicative of the deflection of said one of the tines.

32. An apparatus as claimed in claim 1, wherein said apparatus includes a hall effect sensor located on one of said tines for providing an output signal indicative of local magnetic flux density and hence of the movement of said one of said tines.

33. An apparatus as claimed in claim 1, wherein the tuning fork is insulated from other portions of said apparatus, and said apparatus includes:
- a signal generator for applying a high frequency signal to said tuning fork;
- a series capacitive sensor on one of said tines;
- a modulator for amplitude modulating an output signal from said series capacitive sensor; and
- an amplifier for amplifying the amplitude modulated output signal;
- wherein said current is derived from the amplified and amplitude modulated output signal.

34. A method as claimed in claim 16, wherein said varying current is substantially uni-directional.

35. A method as claimed in claim 16, wherein said coil is substantially cylindrical.

36. A method as claimed in claim 16, including determining a deflection angle of one of said tines from an output signal from a piezoelectric sensor mechanically coupled to said one of said tines.

37. A method as claimed in claim 16, including reflecting laser light from a portion of one of the tines, collecting the laser light reflected from said portion of said one of the tines, detecting the reflected laser light, and determining a deflection of said one of the tines from variations in said detected laser light.

38. A method as claimed in claim 16, including determining the movement of one of said tines from an output signal of a hall effect sensor located on said one of said tines.

39. A method as claimed in claim 16, including:
- insulating said tuning fork;
- applying a high frequency signal to said tuning fork;
- collecting an output signal from a series capacitive sensor located on one of said tines;
- amplitude modulating said output signal;
- amplifying the amplitude modulated output signal; and
- deriving said current from the amplified and amplitude modulated output signal.

\* \* \* \* \*